Nov. 4, 1947.  L. N. CRISPELL  2,429,992
DEFLATABLE AND RETRACTABLE WING PONTOON OR FLOAT
Filed Feb. 24, 1944  3 Sheets-Sheet 1
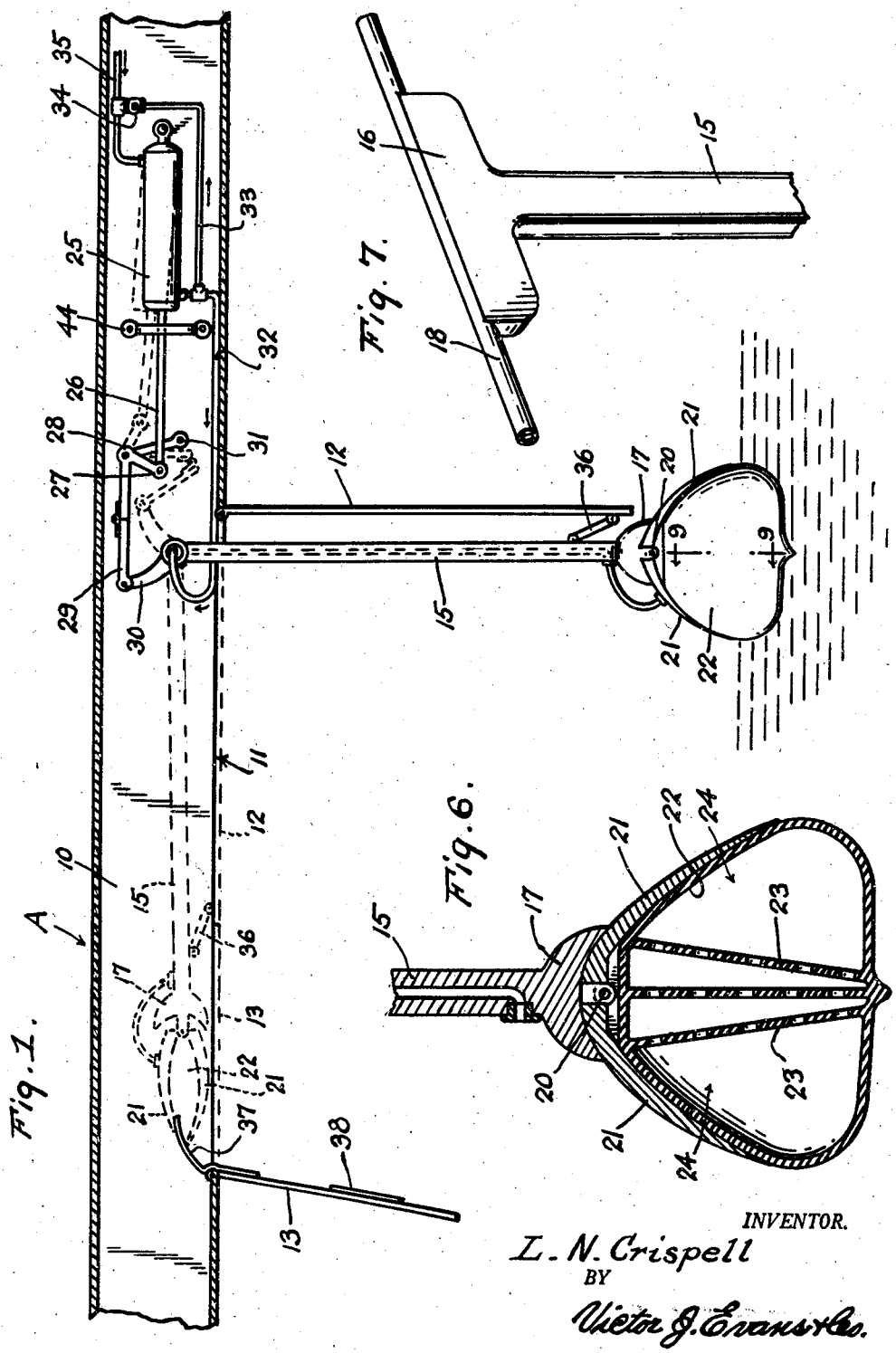
INVENTOR.
*L. N. Crispell*
BY
*Victor J. Evans & Co.*
ATTORNEYS Nov. 4, 1947. L. N. CRISPELL 2,429,992
DEFLATABLE AND RETRACTABLE WING PONTOON OR FLOAT
Filed Feb. 24, 1944 3 Sheets-Sheet 2
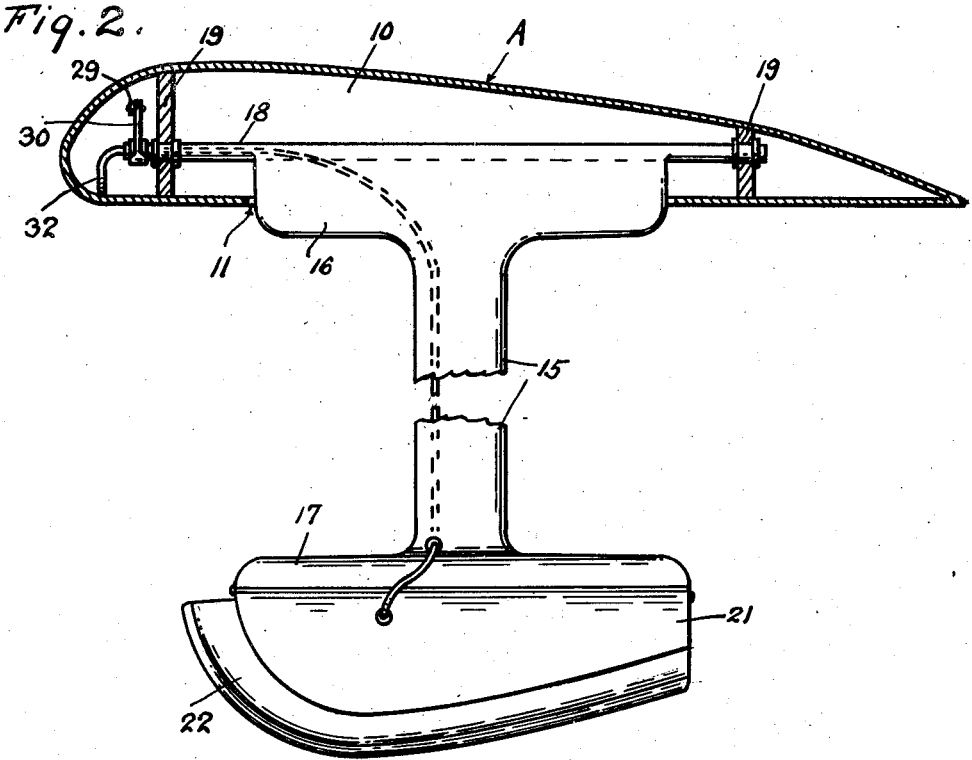
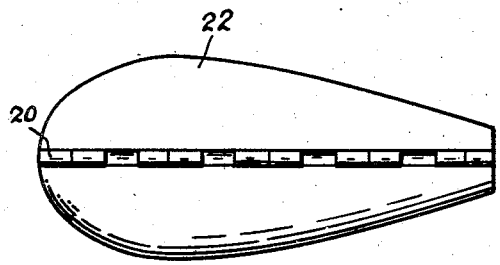
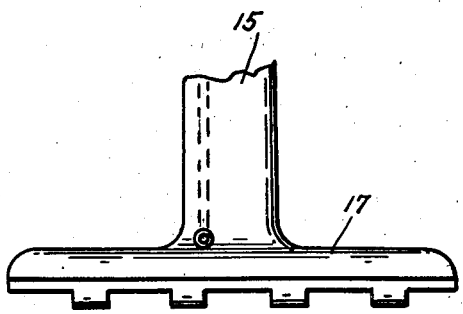
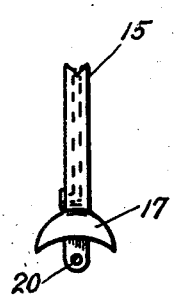
INVENTOR.
L. N. Crispell
BY
Victor J. Evans & Co.
ATTORNEYS Nov. 4, 1947.  L. N. CRISPELL  2,429,992
DEFLATABLE AND RETRACTABLE WING PONTOON OR FLOAT
Filed Feb. 24, 1944  3 Sheets-Sheet 3
Fig. 8.
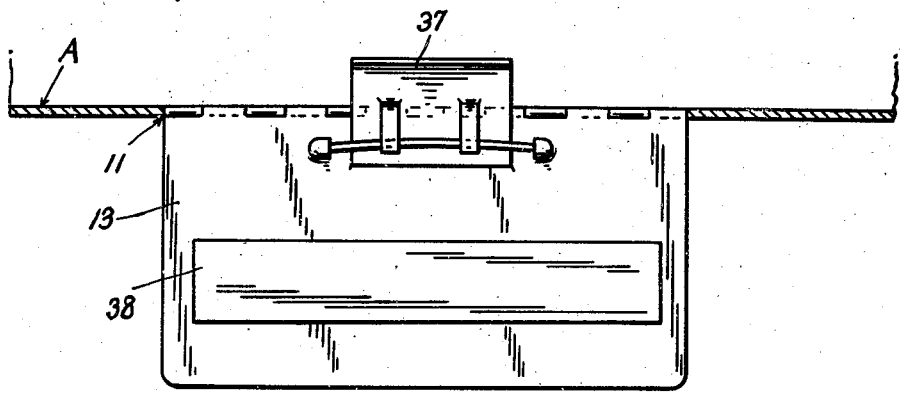
Fig. 9.
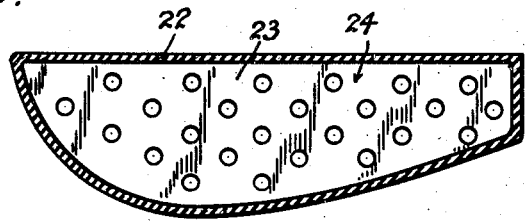
Fig. 10.
Fig. 11.
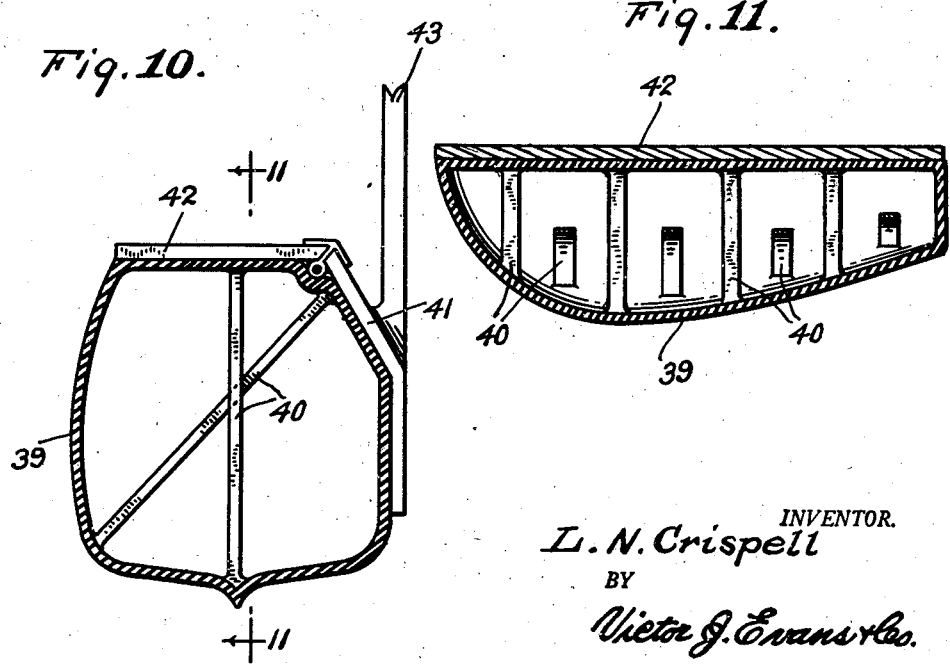
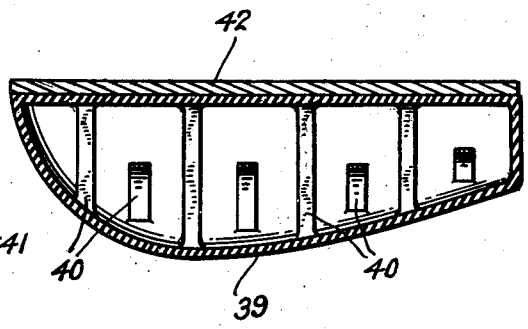
INVENTOR.
L. N. Crispell
BY
Victor J. Evans & Co.
ATTORNEYS Patented Nov. 4, 1947

2,429,992

UNITED STATES PATENT OFFICE 2,429,992

DEFLATABLE AND RETRACTABLE WING PONTOON OR FLOAT

Loren N. Crispell, Kingston, Pa.

Application February 24, 1944, Serial No. 523,702

4 Claims. (Cl. 244—102)

1

The invention relates to airplane wing pontoons or floats, and more especially to deflatable and retractible wing pontoons or floats for aircrafts.

The primary object of the invention is the provision of pontoons or floats of this character, wherein an aircraft can be sustained afloat on a body of water and is possessed of high shock load with a minimum of shock transmission to the wing structure of the craft, greater buoyancy in relation to float area, and requiring less wing wall space for retraction.

Another object of the invention is the provision of a float or pontoon of this character, wherein the same has flexibility, thereby affording greater shock absorption than if it was non-flexible, susceptible of quick field replacement without complete disassembly, and it is of minimum weight due to the use of a small amount of metal in the building of such float or pontoon.

A further object of the invention is the provision of a float or pontoon of this character, which is simple in construction, thoroughly reliable and efficient in operation, readily and easily extended and retracted, conveniently inflated and deflated, automatic in the working thereof, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a fragmentary longitudinal sectional view taken vertically through an aircraft plane, showing the pontoon or float and operating mechanism constructed in accordance with the invention by full lines extended, and by dotted lines retracted, respectively.

Figure 2 is a vertical transverse sectional view through the plane with the pontoon or float extended.

Figure 3 is an inside plan view of the carrier for the pontoon or float body.

Figure 4 is a fragmentary side view of swinging arm or leg for the carrier.

Figure 5 is an end elevation of the arm or leg.

Fig. 6 is a fragmentary vertical cross section through the pontoon or float body and carrier.

Figure 7 is a fragmentary perspective view of swinging mounting of the leg or arm.

2

Figure 8 is a detail side view of one door section of the plane wing.

Figure 9 is a sectional view taken on the line 9—9 of Figure 1 looking in the direction of the arrows.

Figure 10 is a view similar to Figure 6 showing a modification.

Figure 11 is a sectional view taken on the line 11—11 of Figure 10 looking in the direction of the arrows.

Similar reference characters indicate corresponding parts throughout the several views in the drawings.

Referring to the drawings in detail, A designates generally a portion of a rigid plane or wing of an aircraft, it being understood, of course, that each complete plane or wing extends laterally beyond opposite sides of the fuselage of the craft and is a unitary part of the latter, while built within the plane or wing is the retractible and deflatable pontoon or float constituting the present invention and hereinafter described in detail.

The plane or wing A in this particular instance is constructed to provide therein a well or space 10 having a doorway 11 opening through the under side thereof, and this doorway being closed by double swinging doors 12 and 13, respectively, which are hinged at 14 for opening and closing movements outwardly and inwardly relative to the said plane or wing.

Adapted to swing from and into this well or space 10 is a leg or arm 15, preferably made from plastic material, having the relatively long terminal cross heads 16 and 17, respectively, the head 16 being joined with a tubular pintle or pivot shaft 18, which at opposite ends has journal accommodation in spaced vertical struts 19 interiorly of the plane or wing A, so that the said leg or arm 15 can be extended or retracted through the doorway 11, and when retracted will be confined within the well or space 10.

Hinged longitudinally of the terminal head 17 at 20 are the opposed clam shell-like opening and closing jaws 21, which with the leg or arm 15 create a carrier for an inflatable and collapsible buoyant body 22 forming a pontoon or float, it being fixed to the jaws 21 in any suitable manner, and is made from flexible water-proofed material, for example impregnated fabric. Interiorly of the body 22 are spaced perforated partitions 23, creating communicating cells 24 within the same, and effecting wall reinforcements thereto, as well as collapsing mediums for the said body.

Supported within the well or space 10 is an air pump 25, which has its piston stem 26 connected by a pivot 27 to one arm of a bell crank 28, while the other arm of the latter has break-jointed linkage connection 29 with a throw lever 30 fixed to the shaft 18 so that when the stem moves outwardly of the pump 25 cylinder the leg or arm 15 will be extended to bring the pontoon or float into position for water contact, and on the stem 26 working inwardly of the pump 25 cylinder the said arm or leg 15 will be retracted into the well or space 10 within the plane or wing A. The bell crank 28 is pivoted to a rocking support 31 to allow for any arcuate movement of the stem 26 on its reciprocation inwardly and outwardly of the pump 25 in the extending and retracting of the arm or leg 15.

Leading from the cylinder of the pump 25 is an inflation and deflation flexible piping system 32 which extends through the leg or arm 15 for communication with the body 22, so that it can be inflated and deflated in the operation of the pump 25, the deflation of this body 22 being had by a return flexible piping 33 by-passing the pump 25, and having a non-return check valve 34 therein at the point of connection of this piping with the source of air supply and exhaust line 35 which leads to the pump 25 cylinder, this air source for the line 35 being under the control of the operator of the aircraft and may be of any selected construction built within the said craft. Lines 35 supply air to the cylinder 25 in one direction, to force the piston in one direction, and with a suction created in the line 35, the piston is withdrawn in the reverse direction. The air pressure is passed into the rear end of the cylinder to move the piston to the left of the cylinder to move the pontoon to the position shown in full lines, in Figure 1. After the piston passes the connection of the pipe 32 with the cylinder, air pressure will pass through the pipe to the pontoons for the inflating thereof. When suction is applied to move the piston, the valve 34 is automatically opened and the air is withdrawn from the pontoons through pipe 32.

The door 12 is linked at 36 with the arm or leg 15 for the opening and closing thereof concurrently with the swinging of the said leg or arm, while the door 13 has a spring trip device 37 associated therewith to be operated by engagement of the jaws 21, so that when the arm or leg 15 swings outwardly this door 13 will open, and then when the arm or leg swings inwardly the said door will be automatically closed. The door 13 at its inner face carries a mat 38 for the jaws 21 to rest thereon when the said door is closed.

In Figures 10 and 11 of the drawings there is shown a modified form of pontoon or float, wherein the deflatable body 39 is devoid of partitions and in their place are substituted cross straps 40, the said body 39 being carried by the clam shell-like jaws 41 and 42, respectively, and the jaw 41 is stationary, in that it is integral with the leg or arm 43 and off-set parallel with the latter at one side thereof, while the jaw 42 is adapted to swing outwardly away from the jaw 41 at right angles thereto in topping relation to the body 39 when inflated, so that the latter will be disposed at one side of the arm or leg 43, as shown.

In the assembly of the pontoons or floats there are two or more employed for each craft and these are evenly distributed at opposite sides of the fuselage of the said craft, in a longitudinal direction of the latter. It is, of course, desirable to retract the pontoons or floats when they are not in use, as well as deflate the bodies thereof. When the pontoons or floats are extended and distended or inflated they are then in a position for proper landing on a water area to sustain the craft afloat and against sinking. These pontoons or floats when contacting water sustain the entire load of the craft, and function as shock absorbers when landing the said craft.

A minimum amount of metal is used in the constructing of the pontoons or floats and cooperating parts thereof, so that lightness in weight is assured with maximum strength and durability. Easy accessibility is had for field service in repairing and parts replacements. The partitions 23 and the cross strips 40 built within the bodies of the pontoons or floats function as collapsers thereto, they being elastic in kind.

The stem 26 of the pump 25 is movable in a guide bracket 44 suitably arranged within the well or space 10 in the wing or plane.

What is claimed is:

1. A rigid plane having a well therein opening through its lowermost area; a swinging arm within said well and movable outwardly of and retractible within said well, clam shell-like jaws at the outer end of the arm, a collapsible body held by said jaws; and mechanism within the plane for imparting movements to the arm and inflating and deflating the said body said mechanism comprising an air pump; a piston in said pump; a stem on said piston; a bellcrank lever pivoted to said stem; and a throw lever connected to said bellcrank lever; said throw lever being connected to said swinging arm for the actuation thereof.

2. The invention as described in claim 1, wherein the inflation takes place after the pontoon has been lowered and the deflation takes place as the pontoon is raised.

3. The invention as in claim 1, wherein doors are provided for closing said well; a spring trip is provided on one of said doors, the other of said doors being connected to said swinging arm, said first door being opened and closed by engagement of one of the jaws on said arm with said spring trip; and the other of said doors being opened and closed by the swinging movement of said arm.

4. The invention as in claim 1, wherein doors are provided for closing said well, a spring trip is provided on one of said doors, the other of said doors being connected to said swinging arm, said first door being opened and closed by engagement of one of the jaws on said arm with said spring trip, and the other of said doors being opened and closed by the swinging movement of said arm; and a source of operating fluid is supplied for the operation of said mechanism.

LOREN N. CRISPELL.

REFERENCES CITED

The following references are of record in the file of this patent:

UNITED STATES PATENTS

| Number | Name | Date |
|---|---|---|
| 1,866,451 | Carden | July 5, 1932 |
| 2,306,269 | King | Dec. 22, 1942 |
| 2,265,967 | Jacobson | Dec. 9, 1941 |
| 2,267,615 | Mende | Dec. 23, 1941 |